TRANSMISSION LINE TERMINATION CIRCUIT

Filed Jan. 3, 1967

DONALD F. ZEIDLHACK
RICHARD K. WHITE
*INVENTORS*

*BY*
*BUCKHORN, BLORE, KLARQUIST & SPARKMAN*
*ATTORNEYS*

United States Patent Office 3,532,982

Patented Oct. 6, 1970

3,532,982

TRANSMISSION LINE TERMINATION CIRCUIT

Donald F. Zeidlhack, Portland, and Richard K. White, Lake Oswego, Oreg., assignors to Tektronix, Inc., Beaverton, Oreg., a corporation of Oregon Filed Jan. 3, 1967, Ser. No. 606,865
Int. Cl. G01r 13/20, 31/02
U.S. Cl. 324—121 8 Claims

ABSTRACT OF THE DISCLOSURE

The present invention relates generally to termination circuits for transmission lines connected to capacitive loads, and more particularly to a bridged-T termination circuit connected between the output of the transmission line and such load providing an A.C. termination impedance substantially equal to the characteristic impedance of the transmission line over a wide range of frequencies and a D.C. termination impedance of higher value substantially equal to the load resistance.

BACKGROUND

The termination of the circuit of the present invention is especially useful in connecting an electrical probe and its associated coaxial cable transmission line to a capacitive load, such as the input of a cathode ray oscilloscope. One such probe apparatus employing the termination circuit of the present invention has a wide band frequency response of from D.C. to 300 megacycles per second and a fast transient response of less than 1.5 nanoseconds rise time. In addition the termination circuit of the present invention has extremely high D.C. input impedance substantially equal to the load resistance in parallel with the load capacitance at the input of the oscilloscope, so that it does not appreciably load the signal source. Previous bridged-T termination circuit, such as shown in U.S. Pat. 3,155,927 of T. T. True, had the disadvantage of an extremely low D.C. input resistance which is substantially equal to the characteristic impedance of the transmission line. As a result of the low D.C. input resistance these prior termination circuits caused such signal source loading so that much of the output current of the signal source flowed through the termination circuit, requiring much greater power of such signal source.

In an attempt to avoid the signal source loading problem mentioned above, it has previously been proposed to employ electrical probes having high resistance inner conductors or coaxial cables having center conductors of high resistance wire in order to attenuate any signal reflections from the capacitive load. Unfortunately such an apparatus has limited transient response due to its long minimum rise time caused by the large RC time constant required to charge the capacitance of the coaxial cable and the load through the high resistance of the inner conductor of the coaxial cable or probe. The termination circuit of the present invention overcomes these disadvantages by employing the load resistance as a high D.C. termination impedance to reduce signal source loading and enabling the inner conductor of the coaxial cable transmission line to be of low resistance to provide a short rise time transient response. In addition the present termination circuit prevents signal distortion in the form of "overshoot" at the leading and trailing edges of a square wave output signal and reduces "ringing" along the top of such square wave.

OBJECTS

It is therefore one object of the present invention to provide an improved termination circuit for a transmission line connected to a capacitive load, such termination circuit having a high D.C. input resistance and a wide band frequency response.

Another object of the present invention is to provide an improved bridged-T termination circuit for a transmission line having a capacitive load in which the load capacitance and resistance forms part of the termination to provide D.C. termination impedance substantially equal to the load resistance and an A.C. termination impedance substantially equal to the characteristic impedance of such line.

A further object of the present invention is to provide an improved termination circuit for a transmission line having a capacitive load which can be employed with an electrical probe and a coaxial cable each having an inner conductor of low resistance in order to provide a short rise time transient response while at the same time reducing distortion due to overshoot and ringing.

An additional object of the present invention is to provide an improved probe input circuit for a cathode ray oscilloscope including a bridged-T termination circuit having a sort rise time transient response, a wide band frequency response and a high D.C. input resistance.

BRIEF DESCRIPTION OF DRAWINGS

Other objects and advantages of the present invention will be apparent from the following detailed description of a preferred embodiment thereof and from the attached drawings of which.

DETAILED DESCRIPTION OF PREFERRED EMBODIMENT

Figure 1:
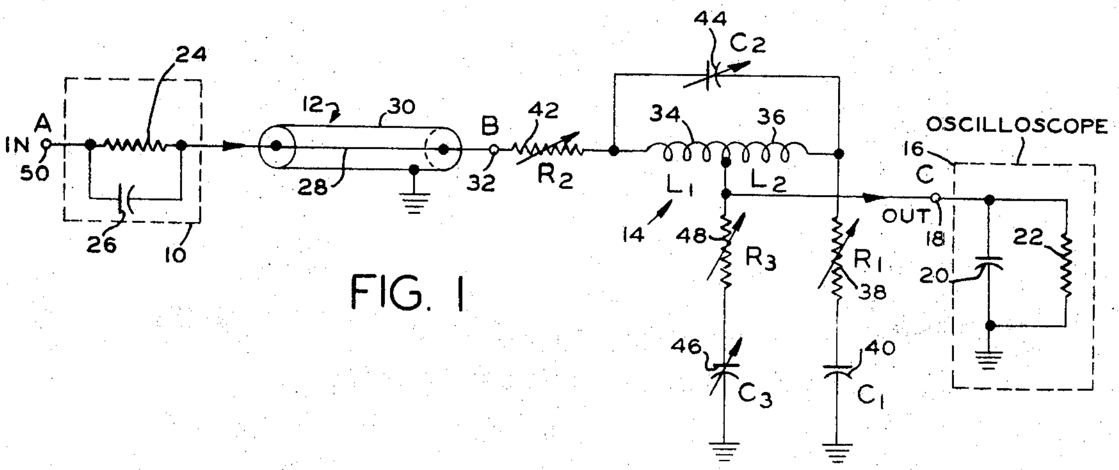
FIG. 1 is a schematic diagram of a probe input circuit or a cathode ray oscilloscope including a transmission line termination circuit in accordance with the present invention.

As shown in the oscilloscope probe input circuit of FIG. 1, an electrical probe 10 is connected through a coaxial cable transmission line 12 and a termination circuit 14 to the input of a cathode ray oscilloscope 16. The input impedance of the oscilloscope provides a capacitive load connected to an output terminal 18 of the termination circuit, which includes a load capacitance 20 connected in parallel with a load resistance 22 between such output terminal and ground. Typical values for the load capacitance 20 vary between 15 and 20 picofarads and the load resistor 22 is about 1 megohm. When a ten times attenuation probe is employed, such probe includes a coupling resistor 24 of 9 megohms, or nine times that of the load resistance 22, and a coupling capacitor 26 of approximately 8.2 picofarads connected across such coupling resistor.

The coaxial cable formed by an inner conductor 28 and an outer conductor 30 has a characteristic impedance of approximately 163 ohms which is substantially uniform along its length. The inner conductor 28 may be made of low or medium resistance wire, having a resistance of, for example, about 39 ohms per foot, or it may be a conventional inner conductor of substantially no resistance. If a resistance wire inner conductor is employed the characteristic impedance, $Z_0$, varies with the frequency of the input signal according to the formula $$Z_0=\frac{R+jwl}{jwc}$$

where R is the resistance of such inner conductor. The outer conductor 30 of the coaxial cable is grounded and such cable is connected at the output of the inner conductor 28 to the input terminal 32 of the termination circuit 14.

The bridged-T termination circuit 14 includes a first and second inductance 34 and 36, which are connected in series and coupled together by mutual inductance. Thus inductances 34 and 36 can be formed by a single, center tapped inductance coil of about .35 microhenries with the common junction at the end of such inductances being connected through such center tap to the output terminal 18. The other end of the second inductance 36 is connected to ground through a first resistance 38 and a first capacitance 40, which together with the second inductance 36 form a first series circuit connected between the output terminal 18 and ground. The first resistance 38 is a variable resistance of 1 kilohm and the first capacitance 40 is a fixed capacitor of 10 picofarads. The other terminal of the first inductance 34 is connected to input terminal 32 through a second resistance 42, which may be a variable resistor of 500 ohms.

A second capacitance 44 is connected between the opposite ends of the series connection of inductances 34 and 36, and may be a variable capacitance having a value which can be changed between 2 and 8 picofarads. In addition, in order to compensate for variations in the input capacitance of the oscilloscope 16 forming load capacitor 20, a third capacitance 46 may be connected in series with a third resistance 48 from the common junction of inductances 34 and 36 to ground in order to provide a second series circuit between output terminal 18 and ground. The third capacitor 46 may be a variable capacitor having a value which can be changed between 5.5 and 18 picofarads, while the third resistance 48 may be a variable resistor having a value of 2 kilohms.

Figure 3:
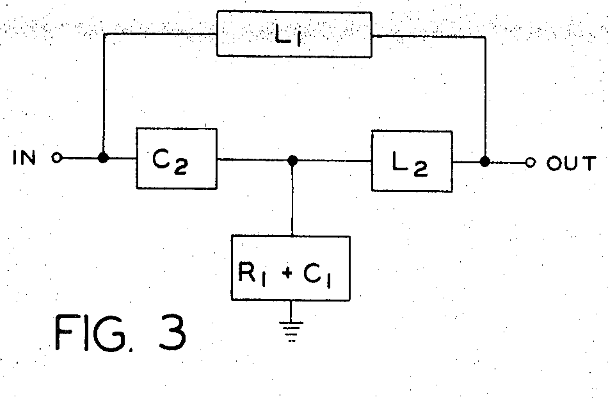
FIG. 3 is a block diagram of the termination circuit of FIG. 1.

As stated previously, the termination circuit of the present invention is a bridged-T termination similar to that of U.S. Pat. 3,155,927. Thus, as shown in FIG. 3 the top of the "T" connected between the input and output terminals of the network is formed by the second capacitance $C_2$ connected in series with the second inductance $L_2$. The junction of $C_2$ and $L_2$ is connected to ground through the series circuit of the first resistance $R_1$ and the first capacitance $C_1$ which form the middle leg of the "T." First inductance $L_1$ forms the bridge connected between the input and output terminals and across the top of the "T." It should be noted that the second resistance 42 as well as the third capacitance 46 and third resistance 48 are not essential and have therefore been omitted from the block diagram of FIG. 3. Thus the second resistance 42 may be eliminated if a resistance wire of the proper value is employed as the inner conductor 28 of the coaxial cable. Also the third capacitor 46 and the third resistor 48 may be eliminated if the load capacitance 20 is of the proper value.

By employing the first capacitor 40 in the leg of the bridged-T termination network to prevent any D.C. current from flowing through such leg, the present circuit differs from that of the above mentioned Pat. 3,155,927 since all D.C. signal current must flow between the output 32 of the transmission line and ground through a single D.C. current path including the load resistor 22. Thus the D.C. input impedance of the present termination circuit may be quite high since it is substantially equal to the load resistance plus any small resistance in the second resistor 42 and the first inductance 34. As a result of the high D.C. input resistance of the termination circuit, the signal source connected to the input terminal 50 of the probe will not be appreciably loaded by such termination circuit and probe. Thus with the ten times attenuation probe of the specific example above, a total D.C. input impedence of 10 megohms is connected across the signal source which will be many times larger than the output impedance of the signal source and will therefore not divert much signal current from such source.

The A.C. termination impedance of the termination circuit 14 is formed primarily by the first resistance 38 and the first capacitance 40 at high frequencies, and is formed by the second resistance 42 and the load capacitor 20, together with the third capacitor 46 and the third resistance 48 at medium and low frequencies. The first resistance 38 is normally set at a value approximately equal to the characteristic impedance of the coaxial cable transmission line 12 and the second resistance 42 is set at a value determined experimentally which gives proper damping of signal reflections. The resulting termination circuit has a wide band frequency response of from D.C. to approximately 300 megacycles per second. Also the transient response rise time of the system of FIG. 1 is less than 1.5 nanoseconds with less than 2 percent ringing waveform abberation.

Figure 2A:
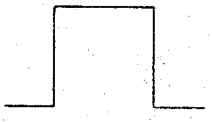
FIGS. 2A, 2B and 2C are waveforms of a pulse signal transmitted through the circuit of FIG. 1, at points A, B and C of the circuit.
Figure 2B:
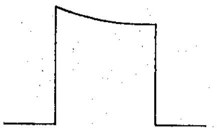
Figure 2C:
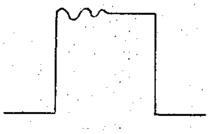

When a rectangular pulse waveform of FIG. 2A is applied to probe input 50 at point A of FIG. 1, it is transmitted through the probe and coaxial cable so that it appears as waveform 2B at point B on the input terminal 32 of the terminating network. It should be noted that the slight overshoot appearing at the leading edge of the waveform of FIG. 2B is due to the low resistance of the inner conductor 28 of the coaxial cable 12. This pulse is transmitted through the termination circuit 14 and appears at point C on the output terminal 18 as the waveform of FIG. 2C with very little overshoot and only a slight amount of ringing along its top edge, which is less than 2 percent of its amplitude. The third capacitance $C_3$ is adjusted to compensate any variations in value of the load capacitance 20 and the third resistance 48 enables adjustment of the charging current for changes in the third capacitance. The second resistance 42 is adjusted for minimum overshoot, while the first resistor 38 and the second capacitor are variable to provide additional waveform shaping to enable optimum rise time and transient response.

It will be obvious to those having ordinary skill in the art that various changes may be made in the details of the above described preferred embodiment of the present invention without departing from the spirit of the invention. For example, the coaxial cable 12 may be a lumped constant artificial transmission line in another circuit. Therefore the scope of the present invention should only be determined by the following claims.

We claim:

1. A transmission line circuit including a transmission line connected to a load impedance having a load capacitance and a load resistance, and a termination circuit connected between the output end of said transmission line and said load impedance, said termination circuit being characterized by means to provide an A.C. termination impedance substantially equal to the characteristic impedance of said transmission line and means to provide a high D.C. termination impedance greater than said characteristic impedance and substantially equal to said load resistance, said D.C. termination impedance being provided by a single D.C. current path between the output end of said transmission line and ground, which path includes said load resistance.

2. A transmission line circuit in accordance with claim 1 in which the termination circuit includes:

a first inductance connected between the input and out put terminals of said termination circuit;

a second inductance having one end connected to the junction of said first inductance and said output terminal, said first and second inductances having mutual inductance coupling therebetween;

a first resistance connected to the other end of said second inductance;

a first capacitance connected in series with said first resistance and said second inductance to form therewith a series circuit between said output terminal and ground; and a second capacitance connected across the series connection of said first and second inductances.

3. A circuit in accordance with claim 2 which also includes a second resistance connected between said first inductance and said input terminal.

4. A circuit in accordance with claim 3 which also includes a third resistance connected to the junction of said first inductance and said output terminal, and a third capacitance connected in series with said third resistance to form therewith another series circuit between said output terminal and ground.

5. A circuit in accordance with claim 4 in which the first, second and third resistances are variable and the second and third capacitances are variable.

6. A circuit in accordance with claim 1 in which the load capacitance is connected in parallel with the load resistance.

7. A circuit in accordance with claim 6 in which said load resistance is many times larger in value than said characteristic impedance.

8. A circuit in accordance with claim 6 in which the transmission line is a coaxial cable connected at its input to an electrical probe and the load capacitance and load resistance are provided by a cathode ray oscilloscope.

References Cited

UNITED STATES PATENTS

| | | | |
|---|---|---|---|
| 2,685,673 | 8/1954 | Avins | 324—72.5 |
| 2,223,736 | 12/1940 | Mertz | 333—32 |
| 3,155,927 | 11/1964 | True | 333—32 |
| 3,336,438 | 8/1967 | Marks | 333—32 XR |

FOREIGN PATENTS

| | | |
|---|---|---|
| 204,404 | 4/1955 | Australia. |
| 892,019 | 1/1944 | France. |

RUDOLPH V. ROLINEC, Primary Examiner

E. F. KARLSEN, Assistant Examiner

U.S. Cl. X.R.

324—72.5, 128; 333—32, 75